(12) United States Patent
Haywood

(10) Patent No.: US 8,585,409 B1
(45) Date of Patent: Nov. 19, 2013

(54) INTERACTIVE HEALTHY EATING TABLE GAME APPARATUS AND GAME

(75) Inventor: Robert C. Haywood, Newark, DE (US)

(73) Assignee: White Wolf LLC, Newark, DE (US)

( * ) Notice: Subject to any disclaimer, the term of this patent is extended or adjusted under 35 U.S.C. 154(b) by 629 days.

(21) Appl. No.: 12/798,737

(22) Filed: Apr. 9, 2010

(51) Int. Cl.
*G09B 19/00* (2006.01)
(52) U.S. Cl.
USPC .......................................... 434/127; 434/308
(58) Field of Classification Search
USPC .................. 434/127, 128, 236, 238, 308, 317
See application file for complete search history.

(56) References Cited

U.S. PATENT DOCUMENTS

| | | | |
|---|---|---|---|
| 2,561,594 A | 7/1951 | Pokras | |
| 3,610,918 A * | 10/1971 | Barlow | 40/432 |
| 3,990,166 A * | 11/1976 | Nagelkirk | 40/442 |
| 4,938,472 A * | 7/1990 | Gould et al. | 273/241 |
| 5,058,894 A * | 10/1991 | Levinn et al. | 273/153 R |
| 5,531,600 A * | 7/1996 | Baer et al. | 434/317 |
| 5,683,251 A * | 11/1997 | Logan et al. | 434/127 |
| 5,691,927 A * | 11/1997 | Gump | 708/131 |
| 6,352,258 B1 | 3/2002 | Fitzgerald | |
| 6,393,401 B1 * | 5/2002 | Loudermilk et al. | 704/272 |
| 6,743,071 B1 | 6/2004 | Tronca | |
| 6,994,555 B2 * | 2/2006 | Weiner et al. | 434/236 |
| 7,000,918 B1 * | 2/2006 | Tan | 273/146 |
| 8,287,327 B1 * | 10/2012 | Ghaly | 446/297 |
| 2005/0011095 A1 * | 1/2005 | Ridenour et al. | 40/564 |
| 2010/0184499 A1 * | 7/2010 | Ritter et al. | 463/9 |
| 2011/0107957 A1 * | 5/2011 | Pizzoferrato | 116/201 |

* cited by examiner

*Primary Examiner* — Bruk Gebrmichael
(74) *Attorney, Agent, or Firm* — Alex E Hobson; Invention To Patent Services LLC

(57) ABSTRACT

An interactive and motivational game apparatus and game are disclosed for encouraging children to eat a healthy meal. Provided is a table game apparatus comprising meal time images, and interactive elements including light, sound, or motion that game players can interact with by pressing activation buttons located on the game apparatus.

6 Claims, 10 Drawing Sheets

INTERACTIVE HEALTHY EATING TABLE GAME APPARATUS AND GAME

FIELD OF THE INVENTION

The present invention relates to motivational games for educating and encouraging children to eat a healthy meal. In one embodiment the game comprises a fun interactive table game apparatus that can be activated during meal time to indicate a food group or food type to consume. In another embodiment the table game apparatus comprises an interactive element such as music, or lights, or vibration, to stimulate and further keep children engaged in playing the game and eating a healthy meal.

BACKGROUND OF THE INVENTION

Children are often reluctant to eat or drink healthy portions during meal time. They become distracted or bored with sitting at the table which frustrates parents and caregivers. It is known that children respond well to positive reinforcement, enjoy playing games, and respond well to interactive electronic devices, particularly when they have some element of direct control. The present invention provides parents with a game apparatus that will take the frustration out of meal time, give children a feeling of control and provides a fun electronic game that will keep them stimulated and engaged in consuming food.

A number of devices have been contemplated to encourage children to eat but most are associated with containers for food. A child's dish or bowl adapted to retain a toy or other prize which may be received by the child only when he has eaten substantially all of the food in the dish is described in U.S. Pat. No. 2,561,594, to Pokras. U.S. Pat. No. 5,823,329 to Roberts, describes a combination of a food dish and an electronic sound unit with latching means for securing the sound unit to the dish, and a feeding utensil for use with the food dish, and a proximate switch means that enables the sound unit when the utensil is brought into proximity to the proximate switch. Another child's feeding bowl is described in U.S. Pat. No. 6,352,258 to Fitzgerald wherein the bowl includes separate food compartments and a chance control means for identifying a compartment that can be eaten out of. Another feeding bowl accessory device is described in U.S. Pat. No. 6,743,071 to Tronca, wherein a rim member designed to be attached to a food container, has a head member that is positioned over the container allowing children to put food through the head member. These devices may encourage children to eat with entertaining stimulus, but may also be distracting since they are in control by the child. In addition, these devices would require cleaning after every meal, and may be subject to breaking or damage from the handling required to clean it after every use.

It is therefore an object of the present invention to provide an interactive and motivational eating game apparatus and game for encouraging children to eat, without the drawbacks of direct food contact, complicated game play, and limited ability of parent or caregiver to direct the game outcome.

SUMMARY OF THE INVENTION

The present invention is aimed at providing parents and caregivers with an interactive and motivational healthy eating game apparatus for encouraging children to eat. It is contemplated that the game apparatus comprise a multifaceted interactive table element having meal time images, such as food groups, on at least three facets. It is further contemplated that by pressing an activation button on the game apparatus, an interactive element such as sound, or light, or motion indicates one of the meal time images on the game apparatus. In one embodiment, the meal time images are food groups and the aforementioned interactive elements indicate to the game player which food group to consume next. Children will enjoy the interactive elements and will be excited to consume the food group indicated so that the interactive elements will again be activated. In one embodiment, when the child, or children have consumed enough food and have activated the interactive elements a preset number of times, the game apparatus will be programmed to activate the interactive elements in a finale' way.

In a preferred embodiment, there are multiple interactive elements and they will be programmed to activate in a corresponding integrated way to produce a multi-sensory experience for the game players. In another embodiment, the table game apparatus can remotely activate interactive elements on a remote game apparatus, such as a wall hanging type game apparatus describe herein.

BRIEF DESCRIPTION OF THE FIGURES

These and other advantages of the present invention are best understood with reference to the drawings, in which.

DETAILED DESCRIPTION OF THE INVENTION

Figure 1:
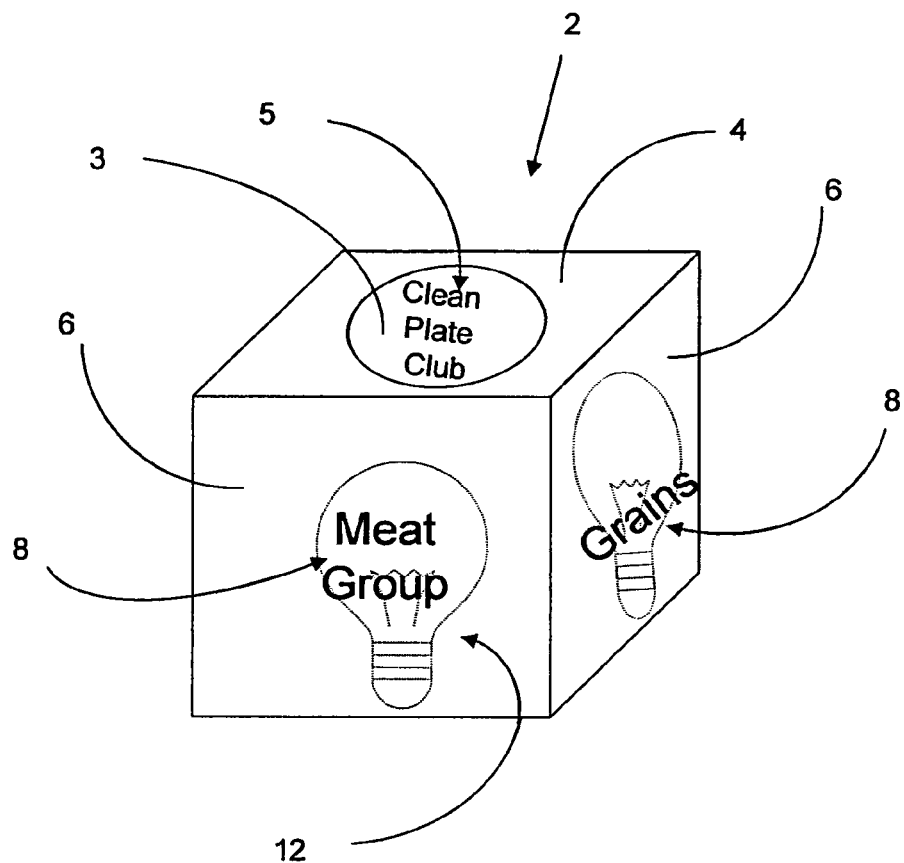
FIG. 1 is an isometric view depicting one embodiment of the table game apparatus according to the present invention having a light element behind the facet.

Several embodiments of the present invention are illustrated generally in FIGS. 1-10. The invention is directed to a game and game apparatus for encouraging children to eat an effective amount. The game comprises a table game apparatus 2 having multiple facets 6 as depicted in FIG. 1. The facets of the game apparatus in one embodiment are generally square or rectangular in shape and are oriented to form a cube or box shape. The table game apparatus comprises at least one interactive element, such as a light, sound, or motion that in one embodiment is activated by a game player by pressing the activation button. For example, as depicted in FIG. 1, the interactive element may be a light element 12 positioned behind the side facets 6, and pressing the activation button 3 on the top facet 4 causes the processor within the game apparatus 2 to activate one of the light elements 12 to turn on, thus indicating a facet. Furthermore, the side facets 6 may comprise a translucent or transparent material, and a meal time image 8, such as the name of a food group as depicted in FIG. 1, and the activation of the light element 12 behind the translucent facet 8, indicates that a game player should eat that food group. The table game apparatus may further comprise a design feature 5 such as the words, "Clean Plate Club" as depicted in FIG. 1

Figure 2:
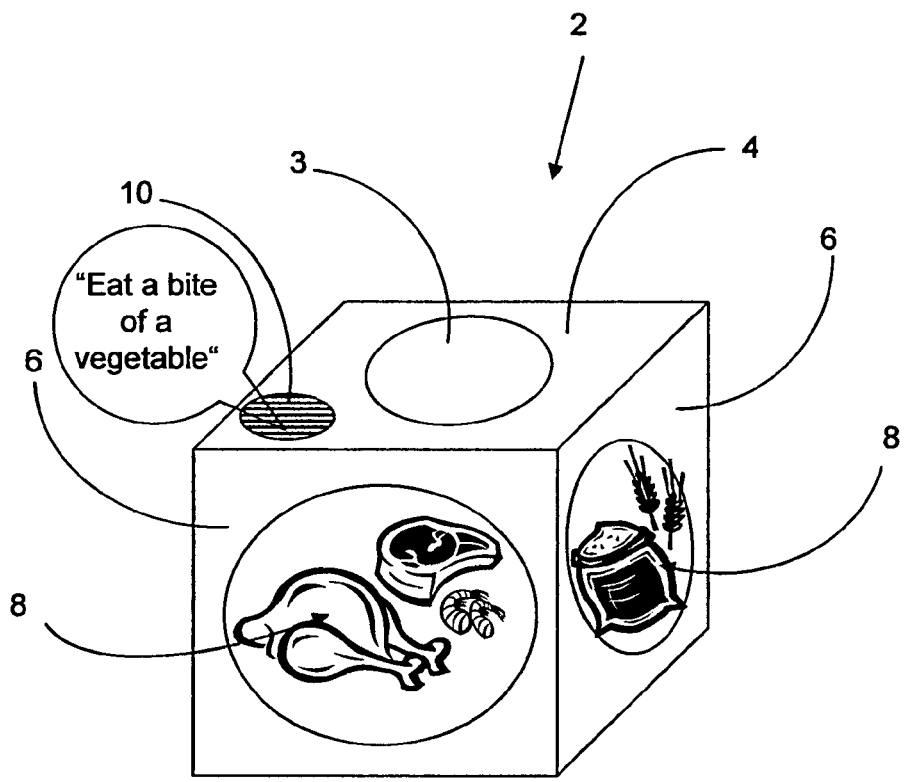
FIG. 2 is an isometric view depicting one embodiment of the table game apparatus according to the present invention having a sound element.

In another embodiment, the table game apparatus 2 comprises a sound element 10 that produces verbal sounds indicating a food group or type of food to consume next, as depicted in FIG. 2. The sound element 10 is depicted on the top facet 4 in FIG. 2, but could be located on any other facet, including a facet with another interactive element such as a light element.

Figure 3:
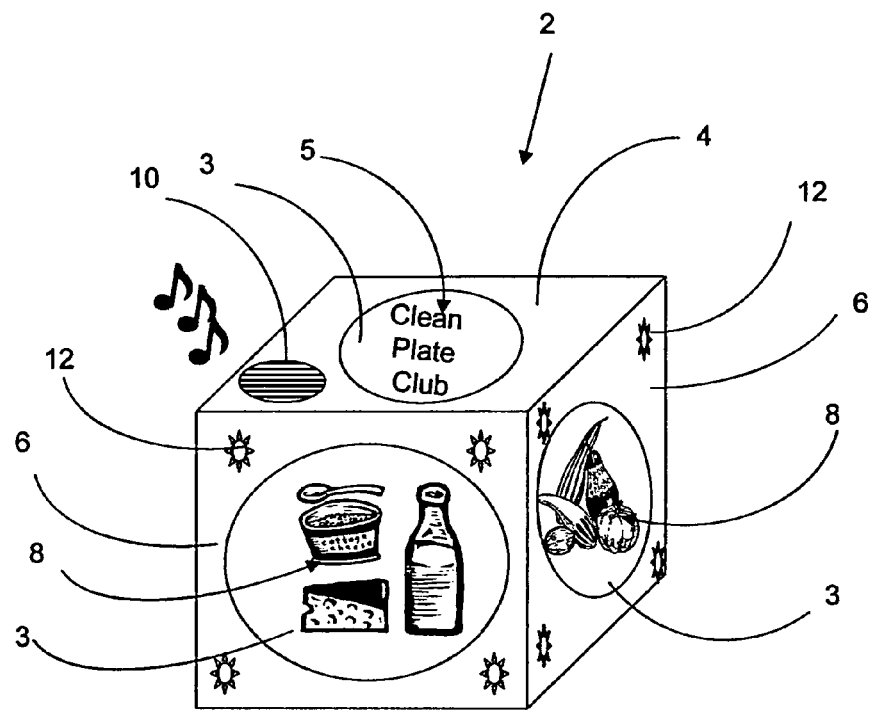
FIG. 3 is an isometric view depicting one embodiment of the table game apparatus according to the present invention having a sound element and a light element.

As depicted in FIG. 3, the table game apparatus comprises a design feature 5, "Clean Plate Club", which is printed on the activation button 3 on the top facet 4. In addition, FIG. 3 depicts the table game apparatus 2 having two types of interactive elements: multiple light elements 12 on each of the side facets 6 of the table game apparatus, and a sound element 10 on the top facet 4. It is conceived that light elements 12 on a side facet 6 would be activated by the pressing the activation button 3 on the top facet 3 and this would indicate which food group to consume, as depicted in FIG. 3. It is further conceived that the control system of the game apparatus could be programmed to randomly or in a random sequence activate the interactive element or elements on the facets each time the activation button is pressed. For example, the control system may be programmed to activate the interactive element on each facet before repeating a facet, but the order of activation may be random, so that the game player can not predict which food group will be activated next. It is further conceived that an activation button could be located on multiple facets, for example on each side facet 6, and that pressing the activation button 3 on a side facet activates an interactive element on that facet to indicate a food group, as depicted in FIG. 3.

In another embodiment, the interactive elements and in particular light elements 12, located on the side facets 6 as depicted in FIG. 3, may all light up after game activation. The game player upon eating a particular food group would then press the facet having the consumed food group image, thereby causing the light element on that facet to deactivate. The goal of this embodiment is to deactivate all side light elements. In another embodiment the game apparatus is programmed to initiate a finale' or game completion activation sequence of the interactive element or elements, after all side facets have been deactivated.

In another embodiment, pressing the activation button on the side facet could activate the sound element to give useful facts about the food group, or design image located on that facet. Furthermore, the sound element 10 in FIG. 3 may be programmed to play music or to produce verbal sounds to encourage the child to eat if too much time elapses without an activation button being pressed. Examples of encouraging quotes that might be programmed to be produced by the sound element when too much time has elapsed include but are not limited to: "Come on and finish up your dinner!" "Don't you want to be strong and healthy?" "You better keep eating your food, so you can be part of the club" Just three more bites!" and "Finish all your food so you can be part of the Clean Plate Club." In addition, the sound element may also be programmed to produce messages during normal game play, either when the activation button is pressed or at random times, and examples of messages that might be programmed include but are not limited to:

"Wow, you are doing a great job" "You are amazing," "You are going to be very strong and healthy," "Milk has calcium and it makes your bones strong," and "Meat has protein and this makes your muscles big and strong."

It is further contemplated that any of the interactive elements may be programmed to activate throughout the game to keep the game players, and in particular the children, engaged and interested in continuing the game. In addition, the interactive elements may be programmed to activate in a corresponding way to produce a more stimulating experience. For example, the light, or light elements on a facet that was indicated after pressing the activation button may blink, or get brighter and dimmer while an encouraging message is produced by the sound element. This creates a multi-sensory game play experience.

Figure 4:
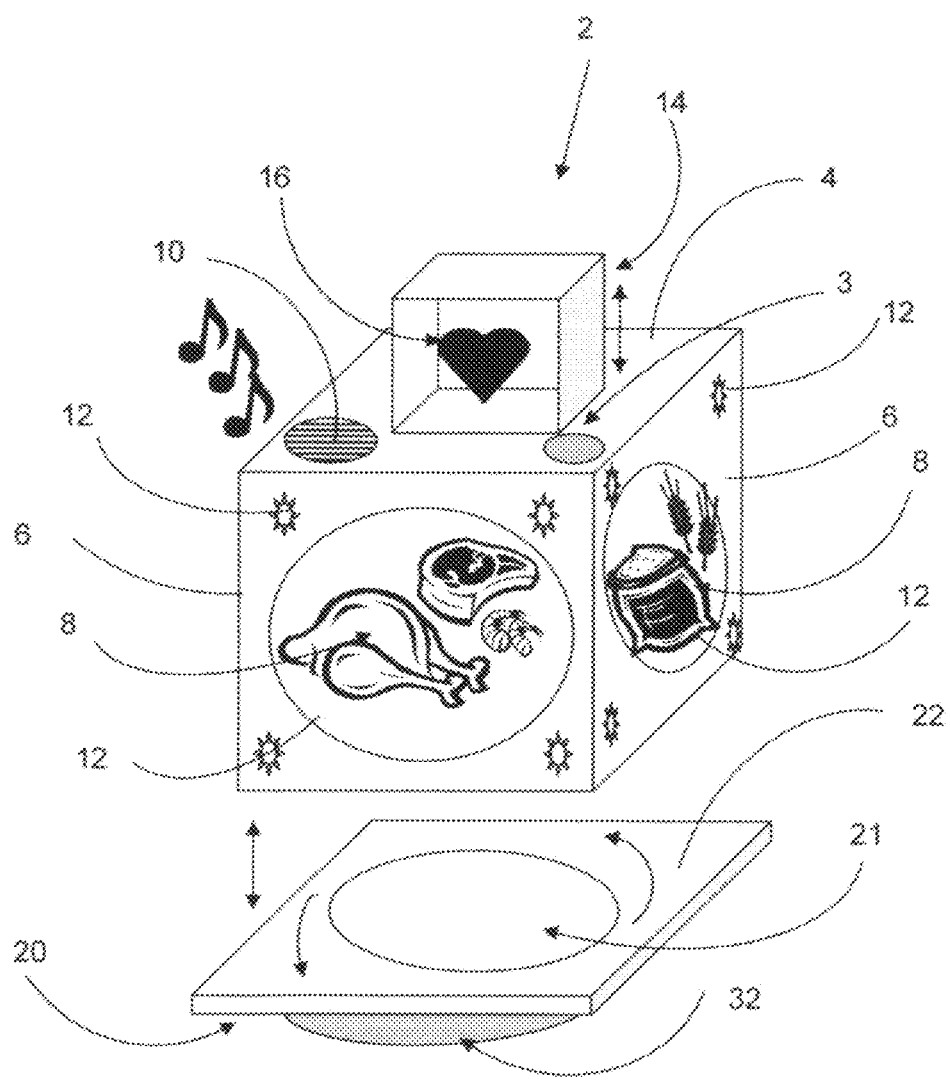
FIG. 4 is an isometric view depicting one embodiment of the table game apparatus according to the present invention having a motion element, detachable base, a rotation element and a slip resistant feature.
Figure 6:
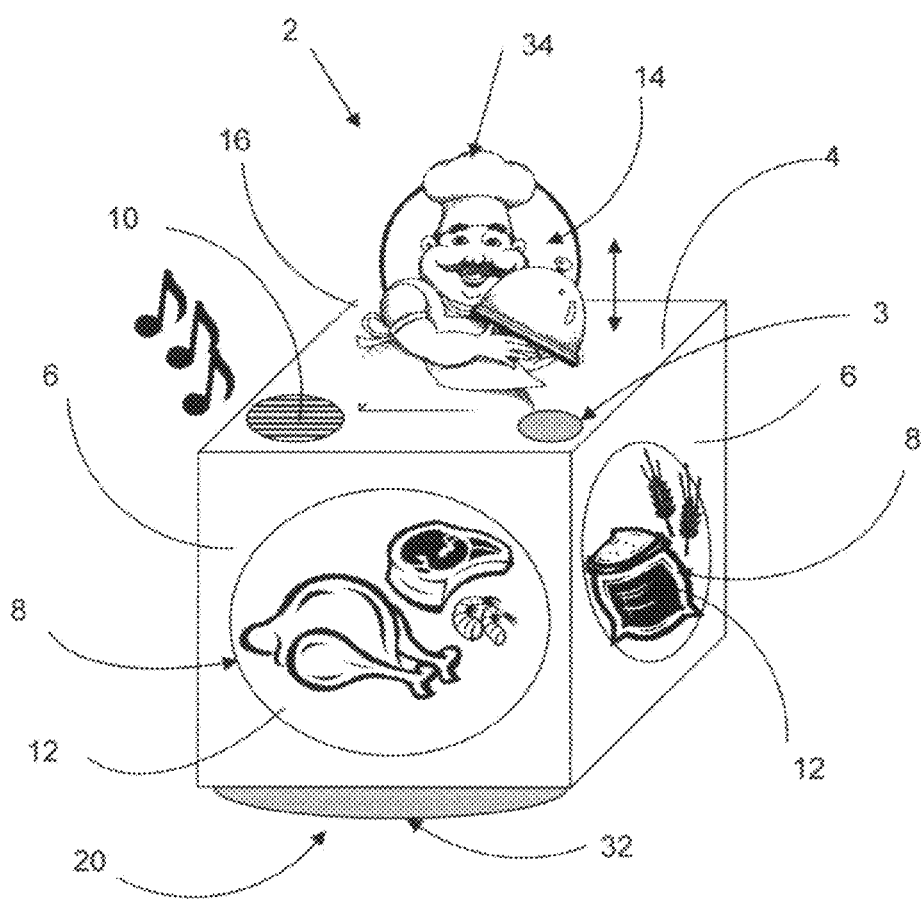
FIG. 6 is an isometric view depicting one embodiment of the table game apparatus according to the present invention having a character feature.

The table game apparatus 2 may be mounted or positioned on a table mount 22 that comprises a slip resistant feature 32, such as a suction cup and a rotation element 21, as depicted in FIG. 4. The slip resistant feature may also be part of the game base 20 as depicted in FIG. 6 and the rotation element may be part of the table game apparatus 2. Since the table game apparatus is used on a table and may be reached by young children, a slip resistant feature may prevent it from inadvertently being knocked off the table. The rotation element 21 depicted in FIG. 4 would allow a game player to rotate the table game apparatus 2 to show another game player which facet has been indicated. In addition, the game apparatus may be spun for additional game play interactivity. In addition, FIG. 4 shows a "pop-up" motion element 14, where a reward 16 may be placed for a child to receive after completing the game or consuming enough food. The reward may be a treat, such as a chocolate, or a sticker or any other object that a child might desire.

Figure 5:
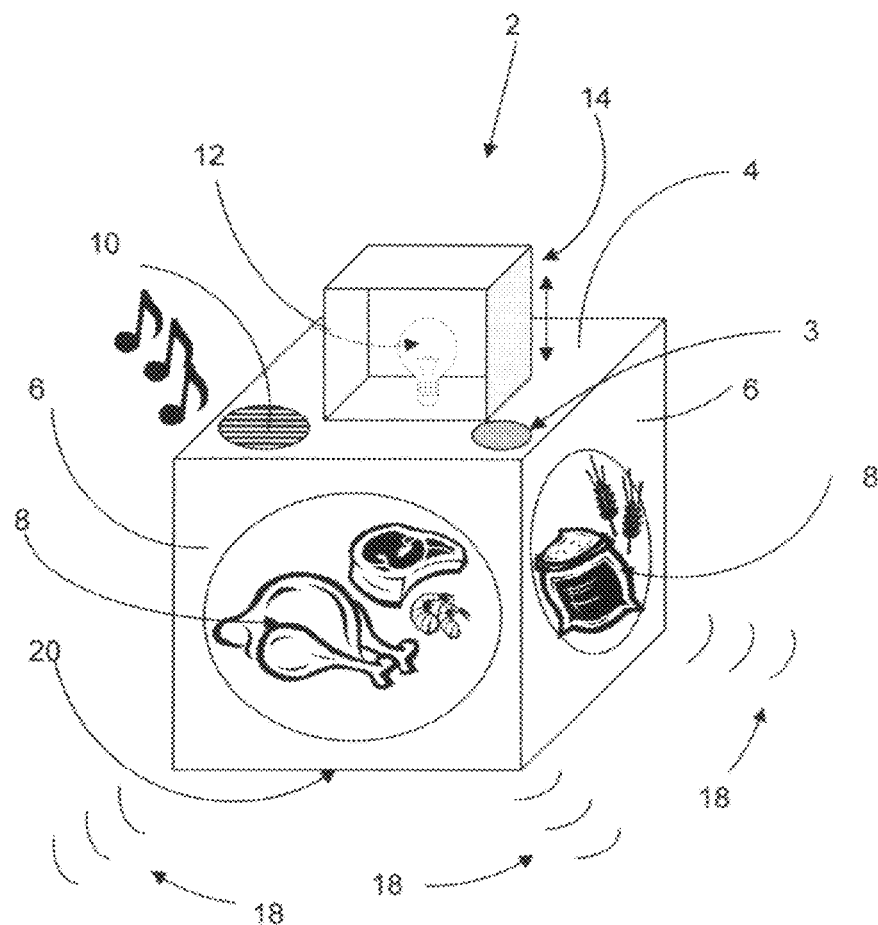
FIG. 5 is an isometric view depicting one embodiment of the table game apparatus according to the present invention having a motion element and a light element incorporated therein.

The table game apparatus 2 depicted if FIG. 5, comprises a light element 12 that is part of the "pop-up" motion element 14. In addition, the table game apparatus 2 is depicted as having a vibration 18 motion element in FIG. 5. This vibration may be activated by pressing an activation button, randomly throughout the game, or at the completion of the game.

In one embodiment, the table game apparatus 2 further comprises a character feature 34, such as a chef, as depicted in FIG. 6. The chef, or character feature 34 is part of a motion element 14 in FIG. 6, and it is further conceived that the sound element 10 could be programmed to produce verbal sounds, or songs that would correspond to the character feature. For example, if the character feature is a cowboy, the sound element may be programmed to produce verbal sounds and phrases such as: "Its chow time", or "Howdy partner." In another preferred embodiment, a motion element that is part of a character feature is programmed to activate in a corresponding manner with the sound element producing verbal sounds. For example, if the character feature is a cowboy, the mouth of the cowboy may be a motion element, and it may be programmed to move as the sound element produces verbal sounds associated with the character.

Figure 7:
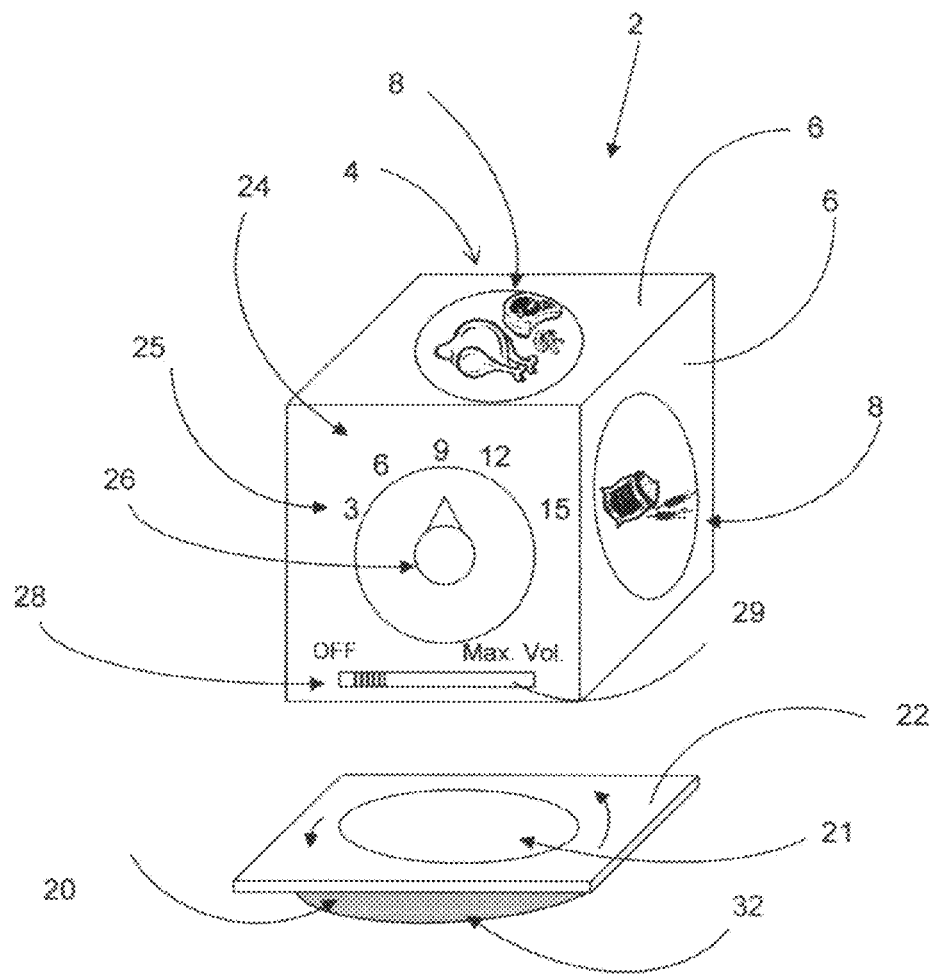
FIG. 7 is an isometric view depicting one embodiment of the table game apparatus according to the present invention having round selector dial.

The table game apparatus depicted in FIG. 7 comprises a round controller 24 comprising a round selector dial 26 and round indicators 25. The table game apparatus depicted in FIG. 7 further comprises an on/off button 28 and volume control 29. In a preferred manner of game play, the table game apparatus is turned on, and the number of rounds of play is selected prior to starting the game. For example, a parent or guardian may set the round selector dial to six, and begin play by pressing the activation button. Pressing the activation button causes the processor of the game to activate an interactive element, thus indicating a food group to consume, as described herein. The child then eats or consumes a bite or bites of food, or drink as indicated before the activation button is pressed again. Each subsequent pressing of the activation button is considered a round of play. When the activation button has been pressed after the sixth round is completed, the control system of the game apparatus may be programmed to activate the interactive element or elements in a different or corresponding way to indicate successful completion of the game. For example, in one embodiment, the game apparatus comprises multiple light elements and a sound element and at the completion of the game, the lights are programmed to flash as a finale' song is played.

Figure 8:
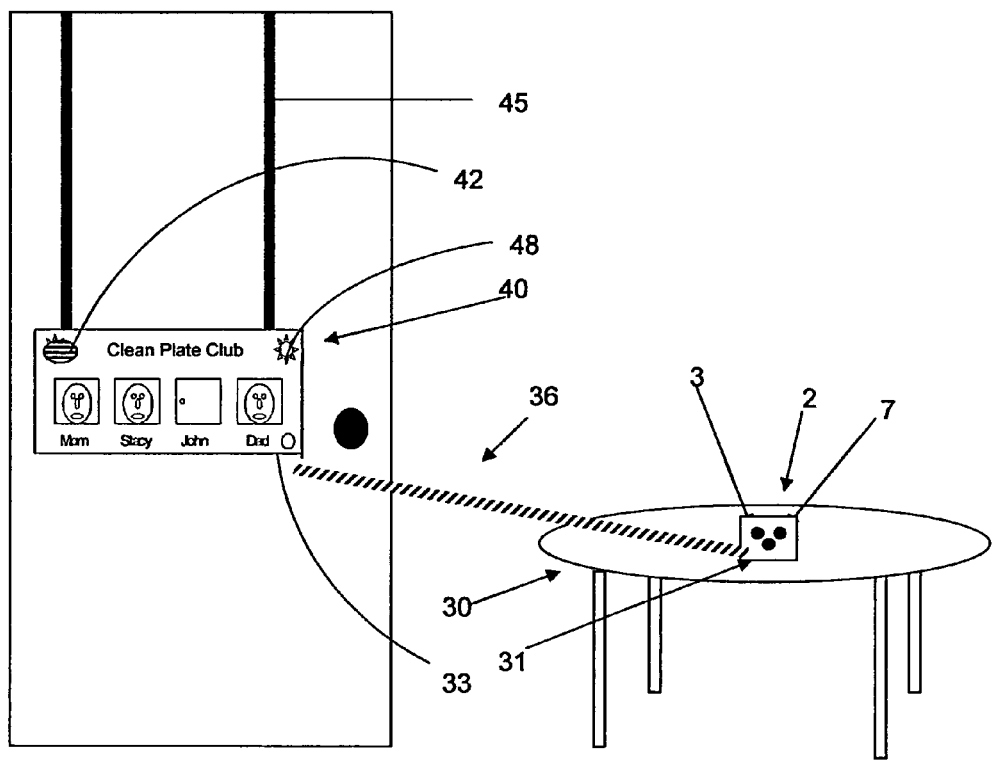
FIG. 8 is a depiction of the table game apparatus and a remote game apparatus having interactive elements that are activated by a remote activation button on the table game apparatus.

In yet another embodiment, a remote game apparatus is provided comprising interactive elements that can be activated by the table game apparatus. The remote game apparatus 40 may be hung from a door, as depicted in FIG. 8, but could also be placed on a counter, or hung on a wall, or the like. In addition, the interactive elements on the remote game apparatus 40, depicted as a light element 48 and a sound element 42 could be activated when the remote activation button 7 is pressed on the table game apparatus 2 which is located on the table 30, and causes the transmitter 31 to send a signal 36 to the receiver 33 on the remote game apparatus, as depicted in FIG. 8. The remote game apparatus 40 depicted in FIG. 9 comprises a character feature 44, a sound element 42, a light element 48, an activation button 50, and game player images 56 with a game player image cover 51 that may be opened to display the game player image.

The table game apparatus is preferably battery powered, to eliminate a cord running across the table during meal time. However, the game apparatus could be constructed to be plugged into an outlet for electrical power, or the batteries could charge when the game is plugged in, or there could be a combination of battery and plug in power attributes. It is envisioned that the control system could also be programmed to turn the game apparatus off after a pre-programmed amount of time has passed or when an activation button on the table game apparatus is pressed and held for a pre-programmed amount of time. Furthermore, the processor system could be programmed to turn on the table game apparatus when any of the activation buttons are pressed.

Figure 10:
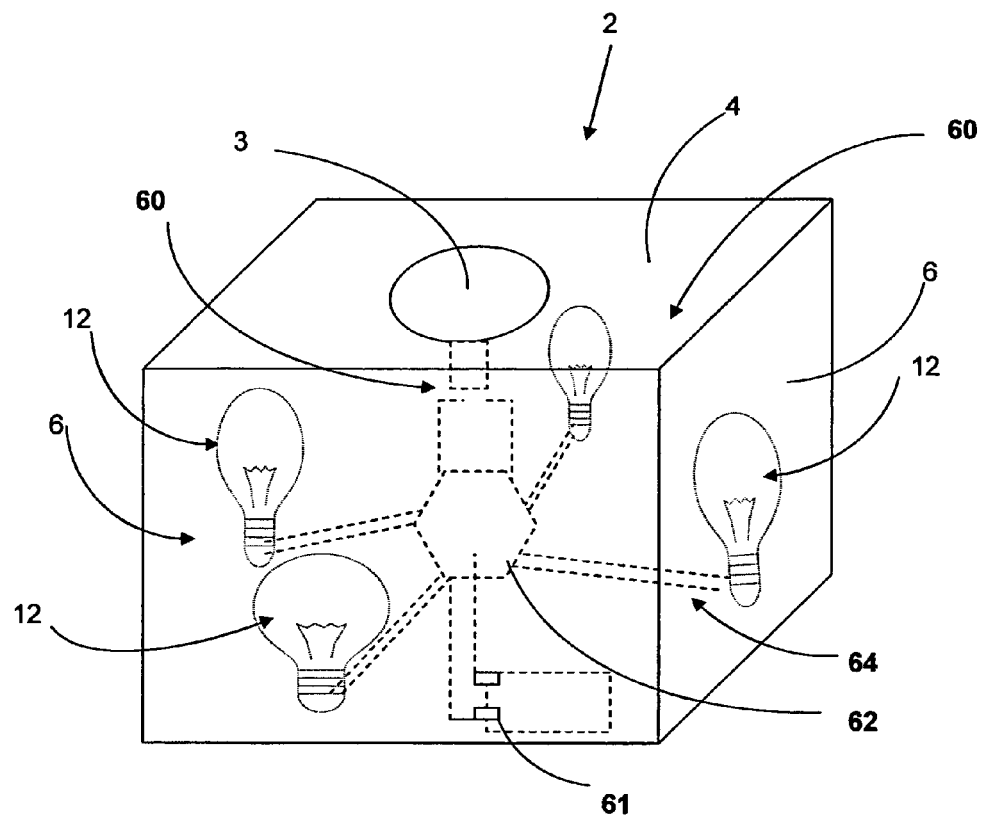
FIG. 10 is an isometric view depicting the control system of the table game apparatus.

The control system 60 of the game apparatus 2 is depicted in FIG. 10 as comprising a battery 61 connected to the processor 62 which may be a chip or other conventional electronic processor, and a circuit 64 connecting the elements of the game apparatus to be controlled by the control system 60. The activation button 3 is depicted in FIG. 10 as having a contact 60 that completes a circuit to activate interactive elements. Although the term "pressed" is used to indicated the manual selection or activation of the activation button, any conventional means to manually make a selection to cause a circuit to be triggered, through touch, pressing or depressing may be used to activate the activation button.

DEFINITIONS

A planar surface, as defined herein, is one of multiple surfaces that define the interior volume of the game apparatus, such as but not limited to, the side surfaces of a cube.

Activation Button, as defined herein, is a mechanical or electric or magnetic feature that can be triggered or pressed to complete a circuit and includes but is not limited to a button, switch, lever or the like.

Interactive Element, as defined herein, is a mechanical, audio or visual feature including but not limited to light, sound, or mechanical motion.

Meal Time Image, as defined herein, is text, images or combination of text and images, related to meal time, including but not limited to words and/or images related to food or food groups, eating, utensils such as plates, cups, forks, spoons, nutrition and the like. Preferred meal time images are the basic four food groups defined as meats, dairy, vegetables and grains.

Sound Element, as defined herein, is an interactive element and is a device that is capable of producing sounds including but not limited to music, animal sounds, verbal sounds such as speech or singing, and comprises but is not limited to a speaker, bell or the like.

Light Element, as defined herein, is an interactive element and is a device that is capable of producing light, and includes but is not limited to a light bulb or diode or the like.

Motion Element as defined herein is an interactive element and is a device that is capable of producing motion such as but not limited to, the character feature moving out from a hidden location, mouth moving, and arms swinging, and the motion can be produced through any conventional means, and includes but is not limited to a motor, a magnetic, a lever, a spring, gravity or the combination thereof and the like.

Design Feature, as defined herein, is text, images or a combination of text and images, related to meal time, including but not limited to words and/or images related to food or food groups, eating, utensils such as plates, cups, forks, spoons, or nutrition and the like. Preferred design features include the text "Three More Bites", or "Clean Plate Club".

Character Feature, as defined herein, is a depiction of an entity that is capable of transmitting sound or speech, such as a person, chef, animal, robot or the like.

Table Game Apparatus, as defined herein, is a multifaceted device that comprises at least one activation button for activating the at least one interactive element located on the table game apparatus.

Game Player, as defined herein, is a person preparing to, engaged in, or finished consuming food and beverages.

Game Director, as defined herein, is a parent or guardian or a responsible person chosen to make an effective consumption decision and makes decisions related to game play including but not limited to when another game player may trigger an activation button, place their game player image on the game frame, open their game player image cover, and determining the number of rounds.

Corresponding Manner, as described herein, refers to a way in which at least two of the interactive elements may be programmed to activate in a related way, such as but not limited to a motion element moving while a light is flashing. In a preferred embodiment, a motion element is part of the character feature and this motion feature is activated in a corresponding manner with a sound element; such as a mouth moving while the sound element produces speech or song.

Food, as defined herein, is either food or beverage.

Activate, as defined herein, is the initiation or stopping of an interactive element. For example, a light element, may be activated to turn on or turn off.

Prophetic Example 1

Three game players consisting of a mother, a father, and their daughter, Stacy, sit down for dinner and place the game apparatus of the present invention in the middle of the table. The father as game director, presses the activation button and the light elements illuminates on one of the facets of the game apparatus as depicted in FIG. 3, indicating which food group Stacy should eat. After Stacy has effectively eaten enough of that food group, the mother presses the activation button and another light element illuminates on another one of the facets to indicate which food group Stacy should eat next. In addition, the sound element plays a song, and produces verbally encouraging statements about eating healthy, as described herein.

Prophetic Example 2

Three game players consisting of a mother, a father and their son, John, sit down for dinner and place the game apparatus of the present invention in the middle of the table. Before beginning the game, the father, acting as game director, turns on the game apparatus, sets the volume level, and sets the number of rounds to be played by setting the round selector dial to nine, as depicted in FIG. 7. The father then places the game apparatus on the table mount and presses the activation button and spins the game apparatus as depicted in FIG. 7. The light elements 12 on one of the side facets 6 are illuminated after pressing the activation button and the father, stops the game apparatus from spinning to show John which food group he is to eat. At one point in the game, a long period of time elapses after pressing the activation button, and the game apparatus, being programmed to do so, automatically activates the sound element to produce an encouraging statement, "It is time for another bite.", "Eating a healthy meal will make you big and strong." When the activation button is pressed for the tenth time an end of game song is played by the sound element and the motion element 14 pops open to display a reward 16 as depicted in FIG. 4.

Prophetic Example 3

Three game players consisting of a mother, a father, and their daughter, Stacy, sit down for dinner and place the game apparatus of the present invention in the middle of the table. Before beginning the game, the father, acting as game director, turns on the game apparatus, sets the volume level, and sets the number of rounds to be played by setting the round selector dial to nine as depicted in FIG. 7. The father then places the game apparatus on the table mount and presses the activation button which causes the dish cover to open, as the motion element as depicted in FIG. 6, and the sound element to produce the quote: "It is time to eat from the meat group; meats contain protein to build strong muscles." After Stacy has effectively consumed enough of the meat group, the Father again presses the activation button, and the sound element produces a verbal quote about which food group to eat next. This continues until 9 rounds of play are completed. When the activation button is pressed for the tenth time an end of game song is played by the sound element.

Prophetic Example 4

Figure 9:
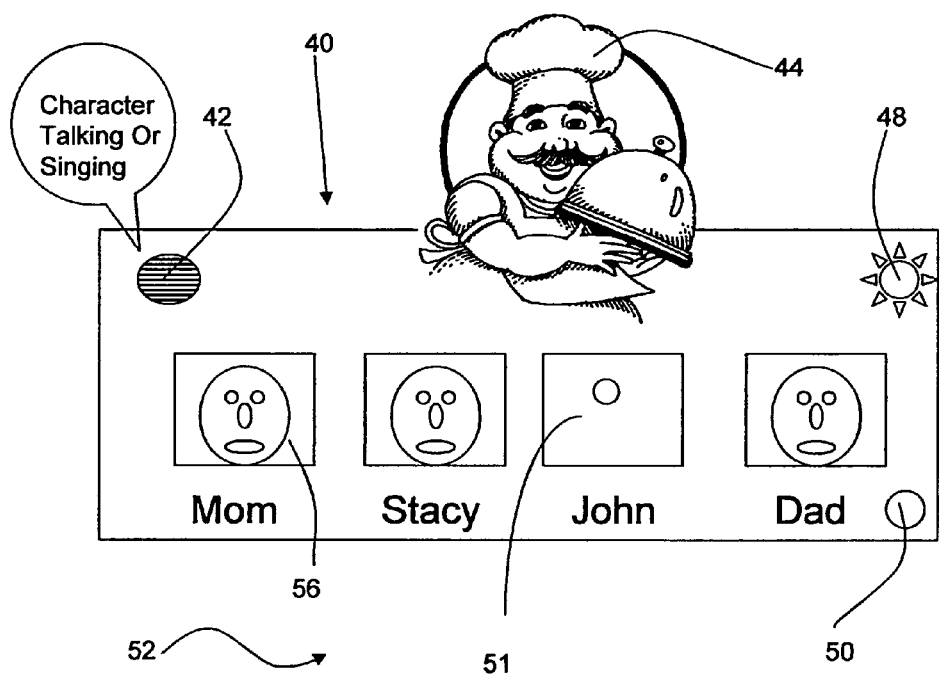
FIG. 9 is a front view depicting one embodiment of the remote game apparatus of the present invention having a character feature, sound and light interactive elements.

Three game players, consisting of a mother, a father and their son, John, sit down for dinner and place the game apparatus of the present invention in the middle of the table. The mother, acting as game director, presses the activation button 3 which causes the lights to illuminate on a facet. John eats the food group indicated on this facet. The father then presses the remote activation button 7 as depicted in FIG. 8, which causes the sound element 42 to play an encouraging song on the remote game apparatus 40, as depicted in FIG. 8. The mother and father continue the game by pressing the activation button 3 and the remote activation button 7 respectively, to indicate food groups to eat and provide encouragement. When John has eaten enough food, he is allowed to open the game player image cover 51 on the remote game apparatus 40, as depicted in FIG. 9. John is then allowed to press the activation button 50 on the remote activation apparatus, which causes the sound element 42 to play an end of game song.

Prophetic Example 5

Three game players, consisting of a mother, a father and their son, John, sit down for dinner and place the game apparatus of the present invention in the middle of the table. The mother, acting as game director, presses the activation button 3, as depicted in FIG. 3, which causes the light elements 12 to illuminate on all side facet. John eats a bite of his chicken finger and then presses the activation button 3 on the facet having a depiction of the meat group, which causes the lights elements on that facet to turn off, and a message to be played from the sound element, "Meat has protein to build strong muscles." John drinks some of his milk and presses the activation button on the facet having a depiction of the dairy group, and again, the lights turn off on that facet and a message plays from the sound element, "Milk comes from cows, Moo." John then eats a bite of green beans and presses the facet having a depiction the vegetables group which causes the light elements on that facet to turn off, and a message to be played from the sound element, "Vegetable come in all colors, what color is the vegetable you are eating?" John then eats a bite of his rice, and presses the activation button on the facet having a depiction of the grains food group, and the lights on this facet turn off and a song is played by the sound element while all the lights on the side facets flash in an end of round fashion. John is very excited to hear the song. The mother then presses the activation button on the top facet of the game apparatus and again, all the lights on the side facets are illuminated to signal the start of another round of interactive play and education.

It should be understood that certain features of the invention, which where, for the sake of clarity, described in separate embodiments may be combined in various combinations into a single embodiment. Conversely, various embodiments or features which, for brevity, were described in the context of a single embodiment may also be provided separately or in any appropriate sub-combinations.

I claim:

1. An interactive and motivational healthy eating game apparatus comprising a multifaceted table game apparatus comprising:
    a) six facets configured to define an interior volume;
    b) at least three meal time design images,
        wherein at least three of the six facets comprises one meal time design image so that each of the three facets comprises a different meal time design image representing a different food group;
    c) a processor;
    d) at least one activation button;
    e) at least one light element corresponding to each of the three facets;
        wherein said processor is configured to activate the at least one light element corresponding to one of the facets when said activation button is pressed, thereby indicating a particular facet by illuminating the corresponding meal time design image on the particular facet;

f) an interactive sound element capable of generating verbal sounds,
  wherein said processor is further configured to generate a message via said interactive sound element while the at least one light element corresponding to the particular facet is illuminated;
g) a rotational element for enabling a game player to rotate the game apparatus;
h) a pop-up motion element comprising a reward element for the game player, said pop-up motion element is installed on one of the six facets different from the three facets, and wherein said pop-up motion element is configured to move out from a hidden location; and
i) a detachable base, wherein the game apparatus is configured to detachably attached to the detachable base.

2. The interactive and motivational healthy eating game apparatus of claim 1, wherein the table game apparatus is configured in a box shape.

3. The interactive and motivational healthy eating game apparatus of claim 1, further comprising a slip resistant feature.

4. The interactive and motivational healthy eating game apparatus of claim 1 further comprises at least one interactive element, whereby the at least one interactive element is activated by the game player after effectively consuming food.

5. An interactive and motivational healthy eating game apparatus comprising a multifaceted interactive table element comprising:
  a) six facets configured in a general box shape, wherein at least three of the facets comprise a meal time design image so that each of the three facets comprises a different meal time design image representing a different food group;
  b) a processor;
  c) at least one activation button;
  d) at least one light element corresponding to each of the three facets;
    wherein said processor is configured to activate the at least one light element corresponding to one of the three facets when said activation button is pressed, thereby indicating a particular facet by illuminating the corresponding meal time design image on the particular facet;
  e) an interactive sound element capable of generating verbal sounds,
    wherein said processor is further configured to generate a message via said interactive sound element while the at least one light element corresponding to the particular facet is illuminated;
  f) a rotational element for enabling a game player to rotate the game apparatus;
  g) a pop-up motion element comprising a reward element for the game player, said pop-up motion element is installed on one of the six facets different from the three facets, and wherein said pop-up motion element is configured to move out from a hidden location; and
  h) a detachable base, wherein the game apparatus is configured to detachably attached to the detachable base.

6. An interactive multifaceted table game apparatus comprising:
  a) six facets configured in a general box shape;
  b) at least three meal time design images configured on at least three of the six facets so that each of the three facets comprises a different meal time design image representing a different food group;
  c) a processor;
  d) at least one activation button;
  e) at least one light element corresponding to each of the three facets,
    wherein said processor is configured to activate the at least one light element corresponding to one of the three facets when said activation button is pressed, thereby indicating a particular facet by illuminating the corresponding meal time design image on the particular facet;
  f) a slip resistant feature;
  g) an interactive sound element capable of generating verbal sounds,
    wherein said processor is further configured to generate a message via said interactive sound element while the at least one light element corresponding to the particular facet is illuminated;
  h) a rotational element for enabling a game player to rotate the game apparatus;
  i) a pop-up motion element comprising a reward element for the game player, said pop-up motion element is installed on one of the six facets different from the three facets, and wherein said pop-up motion element is configured to move out from a hidden location; and
  j) a detachable base, wherein the game apparatus is configured to detachably attached to the detachable base.

* * * * *